(12) United States Patent
Mize

(10) Patent No.: US 6,913,013 B1
(45) Date of Patent: Jul. 5, 2005

(54) CHARCOAL IGNITER AND METHOD

(76) Inventor: Charlie Mize, 6361 Mongoose, Ropesville, TX (US) 79358

( * ) Notice: Subject to any disclaimer, the term of this patent is extended or adjusted under 35 U.S.C. 154(b) by 68 days.

(21) Appl. No.: 10/828,084

(22) Filed: Apr. 20, 2004

(51) Int. Cl.[7] .............................................. F23Q 13/00
(52) U.S. Cl. .................................. 126/25 B; 126/25 R
(58) Field of Search ........................... 126/25 B, 25 R; D7/417; 99/482

(56) References Cited

U.S. PATENT DOCUMENTS

| | | | |
|---|---|---|---|
| 3,073,263 A | | 1/1963 | Wynkoop |
| 3,116,704 A | * | 1/1964 | Byars, Sr. et al. ........ 126/25 B |
| 3,167,040 A | * | 1/1965 | Byars, Sr. et al. ........ 126/25 B |
| 3,216,379 A | | 11/1965 | Durfee |
| 3,296,984 A | | 1/1967 | Durfee |
| 4,023,553 A | * | 5/1977 | London et al. ........... 126/25 B |
| 4,227,510 A | | 10/1980 | Frazier et al. |
| 4,417,565 A | | 11/1983 | Karpinia |
| 4,461,270 A | | 7/1984 | Sutter |
| 4,503,835 A | | 3/1985 | Williams |
| 4,531,507 A | * | 7/1985 | Gerson ..................... 126/25 B |
| 4,604,986 A | | 8/1986 | Barnes |
| 4,777,927 A | | 10/1988 | Stephen et al. |
| 5,197,455 A | | 3/1993 | Tessien |
| 5,299,553 A | | 4/1994 | Giebel et al. |
| 5,469,835 A | | 11/1995 | Stephen et al. |
| 5,638,807 A | * | 6/1997 | Flamenbaum ............. 126/25 B |

FOREIGN PATENT DOCUMENTS

CA        1162123        2/1984

* cited by examiner

Primary Examiner—Sara Clarke
(74) Attorney, Agent, or Firm—Streets & Steele; Steven L. Christian; Frank J. Campigotto

(57) ABSTRACT

An improved charcoal igniter having utility with a charcoal cooking apparatus includes a tubular housing having open upper and lower ends, a grate releasably-mounted within the tubular housing for movement from a supporting position to a releasing position, and an actuator for releasing the grate so that the grate moves from the supporting position to the releasing position. Charcoal briquettes supported within the tubular housing by the grate in the supporting position are released from the grate and fall through the open lower end of the tubular housing when the grate moves to the releasing position.

13 Claims, 3 Drawing Sheets

CHARCOAL IGNITER AND METHOD

BACKGROUND OF THE INVENTION

1. Field of the Invention

The present invention relates to outdoor cooking apparatuses, and more particularly, to chimney-style charcoal igniters for use with such cooking apparatuses.

2. Background of the Related Art

Chimney-style charcoal igniters are well known in the art. These devices typically include a cylindrical housing having a grate disposed therein for holding a number of charcoal briquettes, and a space under the grate for adding newspaper or other ignitable material for setting afire so as to ignite the charcoal. Such charcoal igniters have been found to be an improvement over the use of hydrocarbon igniting fluid and electrical starters, both of which can be hazardous and inconvenient to use.

Known chimney-style charcoal igniters are described in the following U.S. Pat. Nos. 5,469,835; 5,197,455; 4,604,986; 4,503,835; 4,461,270; 4,417,565; 4,227,510; 3,296,984; 3,216,379, and 3,073,263. Another known igniter is described in Canadian Patent No. 1,162,123. Such igniters typically use a single or dual handle system (one example of the latter is shown in FIG. 1) for overturning the housing so that the ignited charcoal briquettes are "poured" out the open upper end of the housing onto a charcoal grill or tray of a charcoal cooking apparatus (a.k.a., "barbecue grill"). While effective for delivering the ignited charcoal to a cooking apparatus, known charcoal igniter handle systems are awkward and cumbersome to use.

Furthermore, when the charcoal briquettes are poured through the open, upper end of the housing, the briquettes at the top of the "stack" are repositioned to the bottom of the charcoal tray or grill of the cooking apparatus. Since these top briquettes are the last to ignite in a chimney-style igniter, they will inevitable be the "coolest" of the charcoal briquettes. Since the heat of the ignited charcoal will rise, it's therefore difficult for these "cool" briquettes to ignite and contribute to the heat demanded for cooking.

Accordingly, a need exists for an improved charcoal igniter and method that provides for safe and efficient delivery of hot charcoal briquettes to a cooking apparatus.

SUMMARY OF THE INVENTION

In one aspect, the present invention provides an improved charcoal igniter for use with a charcoal cooking apparatus. The inventive charcoal igniter includes a tubular housing having open upper and lower ends, a grate releasably-mounted within the tubular housing for movement from a supporting position to a releasing position, and an actuator for releasing the grate so that the grate moves from the supporting position to the releasing position. Thus, charcoal briquettes supported within the tubular housing by the grate in the supporting position are released from the grate and fall through the open lower end of the tubular housing when the grate moves to the releasing position.

The charcoal igniter preferably includes a handle connected to the tubular housing for carrying the charcoal igniter. The handle preferably includes a frame connected to the tubular housing and having a distal portion, and a grip connected to the distal portion of the frame.

The grate preferably has a shape that complements the cross-section of the tubular housing. In a particular embodiment, the tubular housing has a circular cross-section and the grate is circular in shape. The circular grate preferably includes two semicircular sections having opposing sides that are pivotally connected to form a pivotal connection therebetween. Accordingly, the tubular housing of this embodiment includes two stop members for supporting the respective two semicircular sections of the grate in the supporting position. The actuator is adapted for applying a vertical lifting force to the grate at the pivotal connection. The vertical lifting force pulls the semicircular sections clear of the stop members, so that they are free to move under gravity to the releasing position.

The actuator preferably includes a hanger having an upper end and a lower end, and a lever arm having first and second ends. The lower end of the hanger is pivotally-connected to the semicircular sections of the grate at the pivotal connection. A stabilizer is preferably connected across the open upper end of the tubular housing and overlies the pivotal connection. The stabilizer has a central slot therein through which the upper end of the hanger protrudes. The lever arm is connected at the first end thereof to the upper end of the hanger, and the second end of the lever arm defines a trigger. A fulcrum is preferably mounted to the tubular housing and is pivotally connected to the lever arm at a position intermediate the first and second ends of the lever arm. When the charcoal igniter is so-equipped, the application of downward force to the trigger induces pivoting of the lever arm about the fulcrum and upward movement of the hanger that moves the grate from the supporting position to the releasing position.

In another aspect, the present invention provides a method for igniting charcoal, and includes the steps of supporting a plurality of charcoal briquettes upon a releasable grate within a tubular housing having open upper and lower ends, lighting at least a portion of the supported charcoal briquettes, and releasing the grate when the charcoal briquettes become sufficiently hot so that the hot charcoal briquettes fall through the open lower end.

In a further aspect, the present invention provides an alternative method for igniting charcoal. This method includes the steps of supporting a plurality of charcoal briquettes upon a releasable grate within a tubular housing having open upper and lower ends, lighting at least a portion of the supported charcoal briquettes, moving the tubular housing to a location above a charcoal grilling apparatus, and releasing the grate when the charcoal briquettes become sufficiently hot, whereby the hot charcoal briquettes fall through the open lower end into the charcoal grilling apparatus.

The tubular housing preferably includes a handle connected thereto for use in moving the tubular housing.

The releasable grate preferably has a shape that complements the cross-section of the tubular housing. In a particular embodiment, the tubular housing has a circular cross-section and the grate is circular in shape. The circular grate preferably includes two semicircular sections having opposing sides that are pivotally connected to form a pivotal connection therebetween. The tubular housing of this embodiment includes two stop members for supporting the respective two semicircular sections of the grate in a supporting position. Accordingly, the releasing step is achieved by applying a vertical lifting force to the grate at the pivotal connection, whereby the semicircular sections are pulled clear of the stop members and move under gravity to a releasing position.

An actuator is preferably used to apply the vertical lifting force. In a particular embodiment, the actuator includes a trigger mounted near the handle, and the actuator translates a downward force applied to the trigger into the vertical lifting force at the pivotal connection.

BRIEF DESCRIPTION OF THE DRAWINGS

So that the above recited features and advantages of the present invention can be understood in detail, a more particular description of the invention, briefly summarized above, may be had by reference to the embodiments thereof that are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE INVENTION

Figure 1:
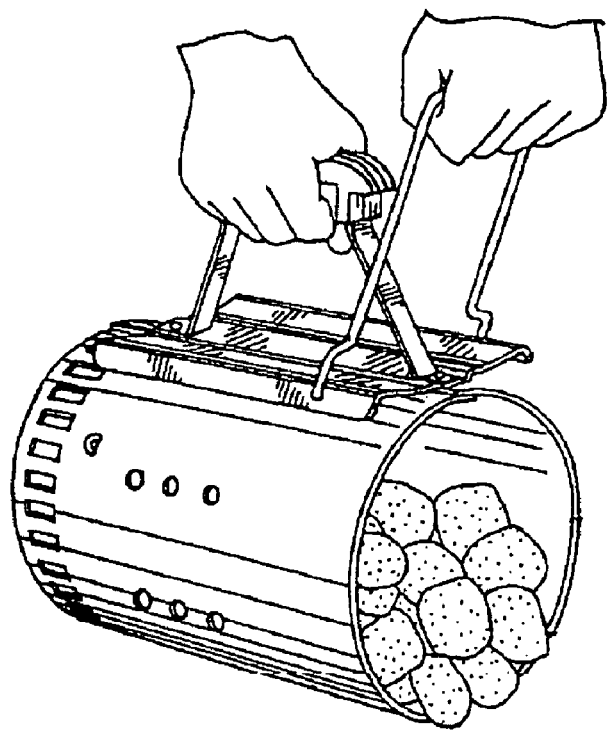
FIG. 1 is an illustration of a prior art charcoal igniter being overturned to deliver charcoal briquettes to a cooking apparatus (not shown).
Figure 2:
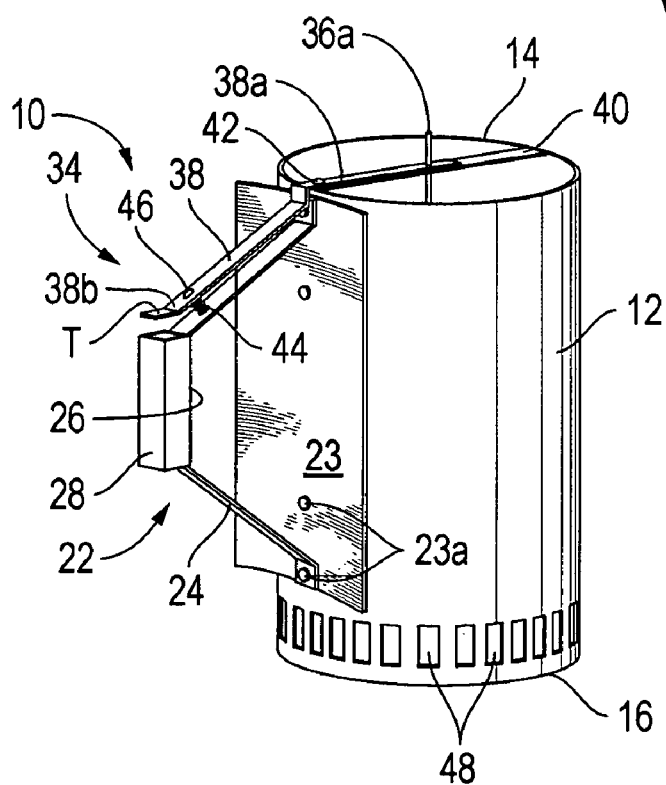
FIG. 2 is a perspective view of an improved charcoal igniter in accordance with the present invention.
Figure 3:
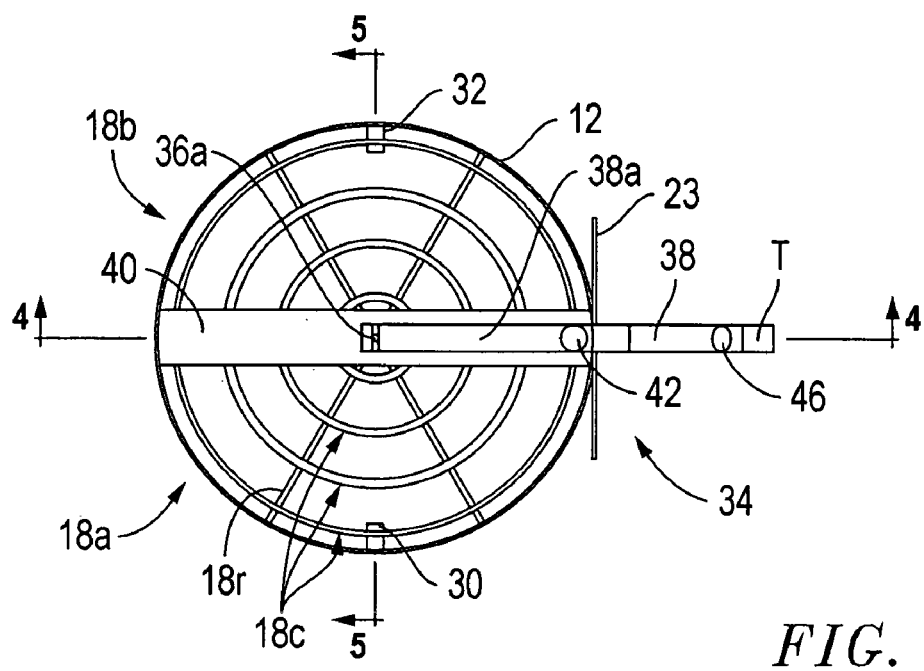
FIG. 3 is a plan view of the charcoal igniter of FIG. 2.
Figure 4:
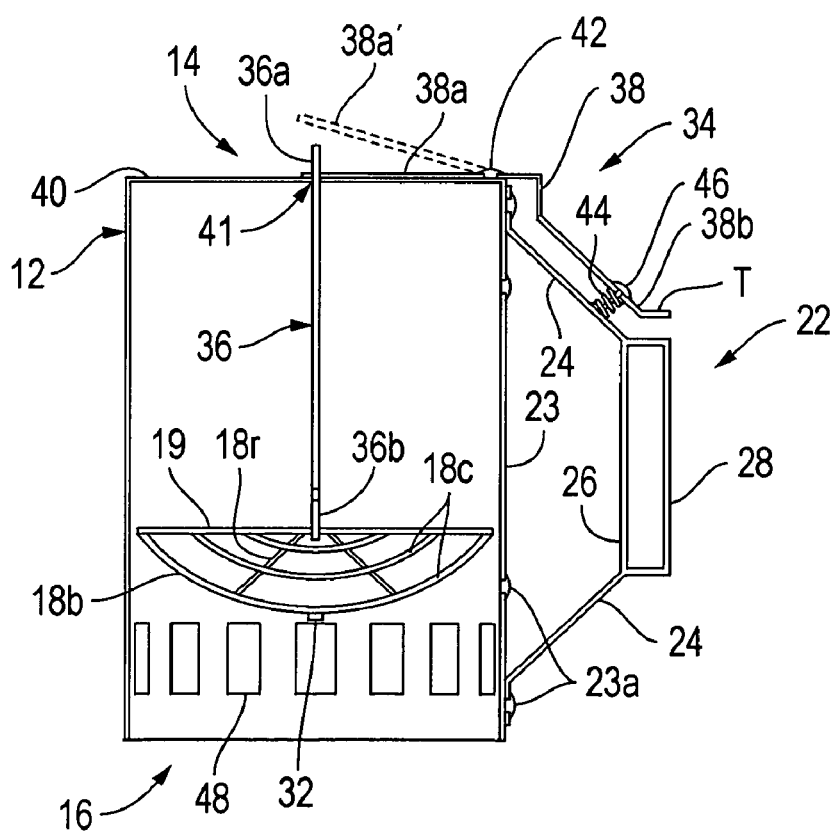
FIG. 4 is a sectional, elevational view of the charcoal igniter, taken along section line 4—4 in FIG. 3.

FIGS. 2–5 illustrate a presently-preferred embodiment of an improved charcoal igniter 10 for use with a charcoal cooking apparatus (a.k.a., "barbecue grill"). The inventive charcoal igniter 10 includes a tubular housing 12 having open upper and lower ends 14 and 16. The housing 12 is preferably constructed of a lightweight, flame-retardant, corrosion-resistant material, such as stainless steel or aluminum. A grate 18 is releasably-mounted within the tubular housing 12 for movement from a supporting position (see FIG. 5A) to a releasing position (see FIG. 5B), as discussed further below. The igniter 10 further includes an actuator 34 (also discussed below) for releasing the grate 18 so that the grate moves from the supporting position to the releasing position. Thus, charcoal briquettes 20 supported within the tubular housing 12 by the grate 18 in the supporting position are released from the grate 18 and fall through the open lower end of the tubular housing 12 when the grate moves to the releasing position.

The charcoal igniter preferably includes a handle 22 connected to the tubular housing 12 for carrying the charcoal igniter 10. The handle 22 preferably includes a frame 24 mounted to the tubular housing 12 and having a distal portion 26. A rectangular grip 28, which is preferably covered with a suitable insulator such as wood or a thermoplastic material, is connected to the distal portion 26 of the frame 22 so that a user can easily move the charcoal igniter 10 during use or for storage. The housing 12 is also equipped with a heat shield 23 for limiting the amount of heat transferred to the grip 28 (and thus the user's hand) from charcoal briquettes ignited within the tubular housing 12. Both the handle 22 and the heat shield 23 are mounted to the tubular housing 12 using a conventional securing means 23a, such as rivets, screws or bolts.

The grate 18 preferably employs a plurality of rod-like members to form a shape that complements the cross-section of the tubular housing. Thus, in the embodiment of FIGS. 2–5, the tubular housing 12 has a circular cross-section and the grate 18 is circular in shape (see FIG. 3), although other shapes (e.g., rectangular, square, oval) may also be used to advantage. The rod-like members of the embodiment shown include concentric annular members 18c and radial members 18r, which cooperate to support a plurality of charcoal briquettes placed within the tubular housing 12. The circular grate preferably includes two semicircular sections 18a, 18b having opposing sides that are pivotally connected to form a pivotal connection 19 therebetween. Accordingly, the tubular housing 12 includes two stop members 30, 32 for supporting the respective two semicircular sections 18a, 18b of the grate 18 in the supporting position shown in FIG. 5A. In this position, the pivotal connection 19 is supported at a slightly higher elevation than the elevation of the stop members 30, 32, although this is not an essential feature of the inventive charcoal igniter 10

Figure 5A:
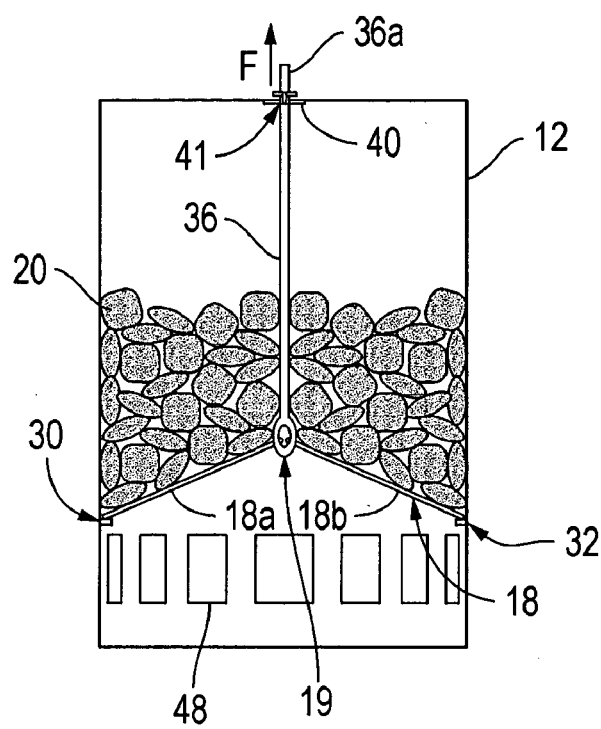
FIG. 5A is a sectional, elevational view of the charcoal igniter, taken along section line 5—5 in FIG. 3, showing charcoal briquettes being supported by a grate within the igniter housing.
Figure 5B:
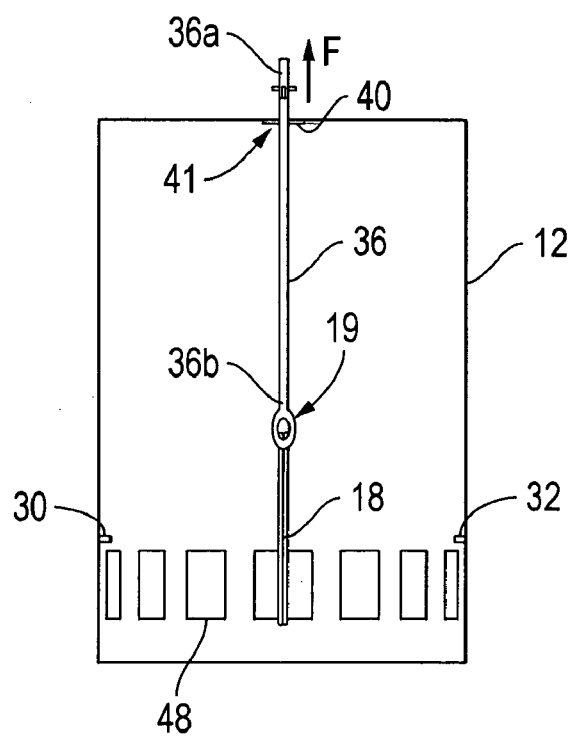
FIG. 5B is similar to FIG. 5A, but the grate has been released to deliver the briquettes through the lower, open end of the housing.

The actuator 34 is adapted for applying a vertical lifting force, in the direction indicated by the arrow F in FIGS. 5A–B, to the grate 18 at the pivotal connection 19. The vertical lifting force pulls the semicircular sections 18a, 18b clear of the stop members 30, 32, so that they are free to move under gravity to the releasing position shown in FIG. 5B. The actuator 34 preferably includes a hanger 36 having an upper end 36a and a lower end 36b, and a lever arm 38 having first and second ends 38a, 38b. The lower end 36b of the hanger 36 is pivotally-connected to the semicircular sections 18a, 18b of the grate 18 at the pivotal connection 19.

A stabilizer 40 is connected across the open upper end 14 of the tubular housing 12 and overlies the pivotal connection 19. The stabilizer 40 has a central slot 41 therein through which the upper end 36a of the hanger 36 protrudes. The lever arm 38 is connected at the first end 38a thereof to the upper end 36a of the hanger 36. The second end 38b of the lever arm defines a trigger T. A fulcrum in the form of a pin 42 is mounted to an upper ridge of the tubular housing 12 (see FIGS. 2 and 4), and is pivotally connected to the lever arm 38 at a position intermediate the first end 38a and second end 38b thereof. A coil spring 44 is secured between the handle frame 24 and the lever arm 38 via a pin 46, so that the second end 38b of the lever arm is biased upwardly and the first end 38a of the lever arm is biased downwardly in their default positions. The application of a downward force to the trigger T (e.g., by a user's thumb) that is sufficient to overcome the biasing force of the spring 44 induces pivoting of the lever arm 38 about the fulcrum 42 so that the first end 38a is moved upwardly to the position indicated at 38a' in FIG. 4. This applies the force F to the hanger 36, and results in an upward movement of the hanger that moves the grate 18 from the supporting position to the releasing position, as indicated by the sequence depicted in FIGS. 5A–5B.

Those skilled in the art will therefore appreciate that the present invention is well suited for delivering ignited charcoal briquettes to a charcoal cooking apparatus. In summary, a plurality of charcoal briquettes are placed upon the releasable grate 18 within the tubular housing 12. At least a portion of the supported charcoal briquettes are ignited using kindling, etc. disposed in the lower region of the housing surrounded by vents 48. When the charcoal briquettes become sufficiently hot, the tubular housing 12 is moved to a location above a charcoal grilling apparatus using the handle 22, and the grate 18 is released using the actuator 34. This permits the hot charcoal briquettes to fall through the open lower end 16 into a suitable charcoal tray or grill of the charcoal grilling apparatus (not shown).

It will be understood from the foregoing description that various modifications and changes may be made in the preferred and alternative embodiments of the present invention without departing from its true spirit.

This description is intended for purposes of illustration only and should not be construed in a limiting sense. The scope of this invention should be determined only by the language of the claims that follow. The term "comprising" within the claims is intended to mean "including at least" such that the recited listing of elements in a claim are an open group. "A," "an" and other singular terms are intended to include the plural forms thereof unless specifically excluded.

What is claimed is:

1. A charcoal igniter, comprising:
    a tubular housing having two stop members therein and open upper and lower ends;
    a grate releasably-mounted within the tubular housing for movement from a supporting position to a releasing position, the grate including two sections having opposing sides that are pivotally connected to form a pivotal connection therebetween, the two stop members of the tubular housing supporting the respective two sections of the grate in the supporting position; and
    an actuator for releasing the grate so that the grate moves from the supporting position to the releasing position, the actuator being adapted for applying a vertical lifting force to the grate at the pivotal connection, whereby the grate sections are pulled clear of the stop members and move under gravity to the releasing position such that charcoal briquettes supported within the tubular housing by the grate in the supporting position are released from the grate and fall through the open lower end when the grate moves to the releasing position.

2. The charcoal igniter of claim 1, further comprising a handle connected to the tubular housing for carrying the charcoal igniter.

3. The charcoal igniter of claim 2, wherein the handle includes a frame connected to the tubular housing and having a distal portion, and a grip connected to the distal portion of the frame.

4. The charcoal igniter of claim 1, wherein the grate has a shape that complements the cross-section of the tubular housing.

5. The charcoal igniter of claim 4, wherein the tubular housing has a circular cross-section and the grate is circular in shape.

6. The charcoal igniter of claim 4, wherein the cross-section of the tubular housing is a shape other than circular.

7. The charcoal igniter of claim 1, wherein the actuator includes a hanger having an upper end and a lower end, the lower end being pivotally-connected to the sections of the grate at the pivotal connection,
    a stabilizer connected across the open upper end of the tubular housing and overlying the pivotal connection, the stabilizer having a central slot therein through which the upper end of the hanger protrudes,
    a lever arm having first and second ends, and being connected at the first end thereof to the upper end of the hanger, the second end of the lever arm defining a trigger, and
    a fulcrum mounted to the tubular housing and pivotally connected to the lever arm at a position intermediate the first and second ends of the lever arm, whereby the application of downward force to the trigger induces pivoting of the lever arm about the fulcrum and upward movement of the hanger that moves the grate from the supporting position to the releasing position.

8. A method for igniting charcoal, comprising the steps of:
    supporting a plurality of charcoal briquettes upon a releasable grate within a tubular housing having open upper and lower ends, the grate including two sections having opposing sides that are pivotally connected to form a pivotal connection therebetween and the tubular housing including two stop members for supporting the respective two sections of the grate in a supporting position;
    lighting at least a portion of the supported charcoal briquettes;
    moving the tubular housing to a location above a charcoal grilling apparatus; and
    releasing the grate when the charcoal briquettes become sufficiently hot by applying a vertical lifting force to the grate at the pivotal connection, whereby the grate sections are pulled clear of the stop members and move under gravity to a releasing position and the hot charcoal briquettes fall through the open lower end into the charcoal grilling apparatus.

9. The method of claim 8, wherein the tubular housing includes a handle connected thereto for use in moving the tubular housing.

10. The method of claim 9, wherein the releasable grate has a shape that complements the cross-section of the tubular housing.

11. The method of claim 10, wherein the tubular housing has a circular cross-section and the grate is circular in shape.

12. The method of claim 8, wherein an actuator is used to apply the vertical lifting force.

13. The method of claim 12, wherein the actuator includes a trigger mounted near the handle, and the actuator translates a downward force applied to the trigger into the vertical lifting force at the pivotal connection.

* * * * *